United States Patent Office 3,497,365
Patented Feb. 24, 1970

3,497,365
PROTECTIVE POLISH
James G. Atherton, Roselle, and Warren A. Wagner, Westmont, Ill., assignors to Armour Industrial Chemical Company, Chicago, Ill., a corporation of Delaware
No Drawing. Continuation-in-part of application Ser. No. 447,981, Apr. 14, 1965. This application July 25, 1968, Ser. No. 747,464
Int. Cl. C09g; C09f; C08h 9/00
U.S. Cl. 106—8      2 Claims

ABSTRACT OF THE DISCLOSURE

Protective polish composition for incorporation into the rinse water during laundering of vehicles, consisting of 10% to 25% by weight quaternary ammonium salt, 3% to 7% cationic emulsifier, 10% to 15% oil, some wax and/or silcone and water.

---

This is a continuation-in-part application of our previously filed copending application Ser. No. 447,981 filed Apr. 14, 1965 now abandoned.

This invention relates to a rinse type protective polish composition, and more particularly to a polish composition which is substantive and therefore particularly useful in very dilute form in the rinse liquids of auto laundries to effect a highly substantive, corrosion-resistant polish on the surface of the vehicle being washed.

Such protective compositions are not generally new; see for example, Soap and Chemical Specialties, February 1962, page 72 et seq. But, most of the compositions used have one or more attributes which are not desirable. Some require relatively expensive ingredients, some are expensive to formulate, some require uneconomical amounts for proper polish effect, some are not too substantive, some are unstable, some possess salt which is corrosive, and some do not mix readily with the rinse liquid.

An object of this invention is to provide a novel protective polish composition.

Another object is to provide a protective polish composition, of the above character, which is highly substantive.

Still another object is to provide a protective polish composition, of the above character, which can be substantially diluted even in rinse waters.

A further object is to provide a protective polish composition which is economical to use.

A still further object is to provide a protective polish composition which provides corrosion protection.

Another object is to provide a protective polish composition which has freeze-thaw stability.

Other objects of the invention will in part be obvious and will in part appear hereinafter.

The invention accordingly comprises a composition of matter possessing the characteristics, properties, and the relation of components which will be exemplified in the composition hereinafter described, and the scope of the invention will be indicated in the claims.

In accordance with the objects enumerated above, the novel protective polish composition of this invention comprises at least one quaternary ammonium salt, at least one cationic emulsifier, oil, and water. More specifically, the polish composition comprises by weight 10 to 25% and preferably about 12% to about 15% of one or more quaternary ammonium salts, such as dicoco dimethyl ammonium chloride or tallow dimethyl ammonium chloride, or disoya dimethyl ammonium bromide, or dicoco diethyl ammonium sulfate, 3% to 7% and preferably about 4% of one or more cationic emulsifiers, such as ethoxylated (10 to 25 moles) tallow amine, or ethoxylated (30 to 60 moles) tallow diamine, or tallow amine acetate admixed with an alkoxylated amine, 15 to 30% and preferably about 21% oil, such as mineral oil or mineral seal oil, and, if desired, some wax or silicone, and the balance water. It is especially preferred to employ dicoco dimethyl ammonium chloride as the quaternary ammonium salt ingredient. Dihydrogenated tallow dimethyl ammonium chloride is also preferred.

The composition is applied to the vehicle by diluting it 75 to 150 fold with water and spraying it onto the vehicle after it has been washed and rinsed or even while it is being rinsed. The completion is so substantive that use during or after rinsing is of no moment. In fact, visual observation of the finished vehicle will immediately reveal this—the remaining water, after application, will quickly run off in droplets and a glossy finish appears.

For a fuller understanding of the nature and objects of this invention, reference should be had to the following detailed examples which illustrate specific compositions falling within the scope of this invention.

EXAMPLE I

The following ingredients are formulated into an emulsion using standard emulsion forming techniques:

| | Percent |
|---|---|
| Arquad 2C-75 (75% active) | [1] 15.76 |
| Ethomeen T/15 | 2.42 |
| Ethomeen T/25 | 1.21 |
| Mineral seal oil | 20.60 |
| Water | 60.01 |

[1] Or 11.72% on an active ingredient basis.

Color can be added if desired.

The above formulation is continuously added (about 2 ounces per gallon of water) to the rinse water of an existing quick wash auto laundry. The laundering technique employed involves washing of the auto body, rinsing with fresh water, followed by a second rinse in which the above formulation has been added. Then, for test purposes, a third rinse of fresh water, without additives, is sprayed on the auto body, blown dry, and the result visually observed. The third rinse water runs off faster and a glossy finish appears on the auto body surface.

To verify the corrosion protection imparted by the composition of this invention, mild steel coupons are treated with regular car rinse solution containing the above composition in the concentrations shown. The coupons are then exposed for ten days at 110° F. and 100% humidity. The observations, after that time, will be as follows:

TABLE I

| Percent active | Observation |
|---|---|
| 0 | Heavy rusting. |
| 8 | Very light rusting. |
| 40 | Very light rusting. |

It is evident that corrosion resistance has been imparted to the steel coupons coated with the composition of this example. It is also evident that high percentages of the composition are not necessary and obviously uneconomical. Corrosion protection is about the same at 8% and at 40%.

EXAMPLE II

Another protective polish composition is made using the following ingredients:

| | Percent |
|---|---|
| Arquad 2HT-75 (75% active) | 11.6 |
| Duoquad T/50 (50% active) | 3.5 |
| Ethomeen T/15 | 2.8 |
| Neo-Fat 18-53 | 1.1 |
| Mineral seal oil | 21.0 |
| Water | 60.0 |

When used to rinse a washed automobile, the same observation as in Example I will be seen.

EXAMPLE III

Still another protective polish composition is made, but this time using the following ingredients:

| | Percent |
|---|---|
| Arquad 2C–75 (75% active) | 5.00 |
| Ethomeen T/15 | 1.00 |
| Silicone SF–96–100 | 0.10 |
| Carnauba wax | 0.10 |
| Mineral seal oil | 4.00 |
| Water (for four fold dilution) | 89.80 |

Testing of the above formulation against existing products will reveal that it is at least equal to, and mostly better, in performance.

Additional formulations were compounded using the same technique of Example I as follows:

EXAMPLE IV

| | Percent |
|---|---|
| Arquad 2C–75 (75% active) | 3.15 |
| Ethomeen T/15 | 0.48 |
| Ethomeen T/25 | 0.24 |
| Mineral seal oil | 4.12 |
| Water (for four fold dilution) | 93.01 |

EXAMPLE V

| | |
|---|---|
| Arquad 2C–75 (75% active) | 13.00 |
| Ethomeen T/15 | 2.00 |
| Ethomeen T/25 | 1.00 |
| Mineral Seal Oil | 17.00 |
| Water | 67.00 |

EXAMPLE VI

| | |
|---|---|
| Arquad 2C–75 (75% active) | 15.76 |
| Ethomeen T/15 | 2.42 |
| Ethomeen T/25 | 1.21 |
| Mineral seal oil | 20.60 |
| Water | 60.01 |

EXAMPLE VII

| | |
|---|---|
| Arquad 2C–75 (75% active) | 19.70 |
| Ethomeen T/15 | 3.03 |
| Ethomeen T/25 | 1.52 |
| Mineral seal oil | 25.96 |
| Water | 40.00 |

EXAMPLE VIII

| | |
|---|---|
| Arquad 2C–75 (75% active) | 23.63 |
| Ethomeen T/15 | 3.64 |
| Ethomeen T/25 | 1.82 |
| Mineral seal oil | 30.91 |
| Water | 40.00 |

In the above examples, the trademarks used refer to the following compounds:

Arquad 2C–75.—Dicoco dimethyl ammonium chloride 75% active sold by Armour Industrial Chemical Company, Chicago, Ill.

Arquad 2HT–75.—Distearyl dimethyl ammonium chloride 75% active sold by Armour Industrial Chemical Company, Chicago, Ill.

Duoquad T/50.—Chloride quaternary of tallow diamine 50% active, sold by Armour Industrial Chemical Company, Chicago, Ill.

Ethomeen 2/15.—Tallow amine ethoxylated with 5 moles of ethylene oxide sold by Armour Industrial Chemical Company, Chicago, Ill.

Ethomeen T/25.—Tallow amine ethoxylated with 15 moles of ethylene oxide sold by Armour Industrial Chemical Company, Chicago, Ill.

Neo-Fat 18–53.—Stearic acid, sold by Armour Industrial Chemical Company, Chicago, Ill.

Silicone SF–96–100.—Methyl silicone (100 cps. viscosity sold by General Electric Co., Waterford, N.Y.

The above formulations involve fairly economical ingredients. The finished formulations have good shelf life, inhibit corrosion and act as protective polishes when applied to automobile bodies. The diluted form (2 to 6 ounces per 1 to 2 gallons of water), in which they may be used, make them extremely economical. Indeed, at this rate, a 10 gallon drum of the formulation will put a uniform luster on about 1000 to 3000 automobiles. The low viscosity and compatibility makes dilution quite easy and, if desired, a proportioning pump can be used for such purpose.

It will thus be seen that the objects set forth above, among those made apparent from the preceding description, are efficiently attained; and, since certain changes may be made in the above composition of matter without departing from the scope of the invention, it is intended that all matter contained in the above description shall be interpreted as illustrative and not in a limiting sense.

Now that the invention has been described, what is claimed as new and desired to be secured by Letters Patent is:

1. A protective polish composition suitable for incorporation into rinse waters during laundering of vehicles comprising by weight about 12% of a quaternary ammonium salt as the substantive component of the composition selected from the group consisting of dicoco dimethyl ammonium chloride, tallow dimethyl ammonium chloride, disoya dimethyl ammonium bromide, dicoco diethyl ammonium sulfate, ditallow dimethyl ammonium chloride; about 4% of a mixture of cationic emulsifier as the emulsifying component of the composition selected from the group consisting of tallow amines ethoxylated with 5 to 15 moles of ethylene oxide, tallow diamine ethoxylated with 30 to 60 moles of ethylene oxide, and tallow amine acetate admixed with said ethoxylated amine; about 21% of a member of the group consisting of mineral oil and mineral seal oil; and the balance water.

2. The composition of claim 1 wherein the cationic emulsifiers are tallow amine ethoxylated with 5 moles of ethylene oxide and tallow amine ethoxylated with 15 moles of ethylene oxide.

References Cited

UNITED STATES PATENTS

| 2,584,413 | 2/1952 | Baer et al. | 106—11 |
| 2,745,809 | 5/1956 | Cardwell et al. | 252—8.55 |
| 3,088,796 | 5/1963 | Kahler et al. | 252—392 XR |
| 3,154,489 | 10/1964 | Du Brow et al. | |
| 3,222,201 | 12/1965 | Boyle et al. | 106—3 XR |

JULIUS FROME, Primary Examiner

J. B. EVANS, Assistant Examiner

U.S. Cl. X.R.

106—11, 243, 271, 285; 252—153, 390, 392